United States Patent
Casamayón Antón et al.

(10) Patent No.: US 11,647,443 B2
(45) Date of Patent: May 9, 2023

(54) METHOD AND AIRBORNE SYSTEM FOR AIRCRAFT WIRELESS COMUNICATIONS THROUGH TERRESTRIAL CELLULAR COMMUNICATIONS NETWORKS WITHOUT ANY MODIFICATION ON GROUND

(71) Applicant: AIRBUS DEFENCE AND SPACE, S.A.U., Getafe (ES)

(72) Inventors: Jorge Casamayón Antón, Getafe (ES); Carlos Gomez Calero, Getafe (ES)

(73) Assignee: Airbus Defence and Space, S.A.U., Getafe (ES)

( * ) Notice: Subject to any disclaimer, the term of this patent is extended or adjusted under 35 U.S.C. 154(b) by 18 days.

(21) Appl. No.: 17/307,308

(22) Filed: May 4, 2021

(65) Prior Publication Data

US 2021/0352559 A1    Nov. 11, 2021

(30) Foreign Application Priority Data

May 5, 2020 (EP) .................................. 20382369

(51) Int. Cl.
*H04W 36/32* (2009.01)
*H04B 7/01* (2006.01)
(Continued)

(52) U.S. Cl.
CPC .............. *H04W 36/32* (2013.01); *H04B 7/01* (2013.01); *H04B 7/0617* (2013.01); *H04W 16/28* (2013.01); *H04W 84/06* (2013.01)

(58) Field of Classification Search
CPC ..... H04W 36/32; H04W 16/28; H04W 84/06; H04W 4/44; H04W 36/0058;
(Continued)

(56) References Cited

U.S. PATENT DOCUMENTS

| 8,831,601 B2 | 9/2014 | Mitchell |
| 2012/0200458 A1 | 8/2012 | Jalali et al. |

(Continued)

FOREIGN PATENT DOCUMENTS

| WO | WO 2017/097997 A1 | 6/2017 |
| WO | WO 2017/201383 A1 | 11/2017 |

OTHER PUBLICATIONS

European Search Report for Application No. 20382369.5 dated Oct. 16, 2020.

*Primary Examiner* — Eric Myers
(74) *Attorney, Agent, or Firm* — KDW Firm PLLC

(57) ABSTRACT

A method and system for Air-To-Ground communications allowing integration of the aircraft communication with a terrestrial cellular communications network. The solution is carried out in the aircraft so any existing standard terrestrial cellular communication network may be used without requiring any modification. The constraints due to the special aircraft conditions (speed and height) are efficiently solved, allowing broad interoperability with the cellular communications network, satisfying the increasing high speed data demand. Specifically, in order to solve the handover constraints the aircraft antenna will create at least two radiation patterns: one for maintaining the current connection with the serving base station and another one or more to search the next suitable best station for handover.

20 Claims, 6 Drawing Sheets

(51) Int. Cl.
*H04B 7/06* (2006.01)
*H04W 16/28* (2009.01)
*H04W 84/06* (2009.01)

(58) Field of Classification Search
CPC ....... H04W 36/08; H04B 7/01; H04B 7/0617; H04B 7/18519; H04B 7/18506
See application file for complete search history.

(56) References Cited

U.S. PATENT DOCUMENTS

| | | | |
|---|---|---|---|
| 2014/0327577 A1 | 11/2014 | Ozaki et al. | |
| 2017/0041895 A1* | 2/2017 | Gan | H04W 56/0035 |
| 2020/0296649 A1* | 9/2020 | Dudzinski | H04W 36/0022 |
| 2021/0159971 A1* | 5/2021 | Panchal | H04B 7/1855 |

* cited by examiner

METHOD AND AIRBORNE SYSTEM FOR AIRCRAFT WIRELESS COMUNICATIONS THROUGH TERRESTRIAL CELLULAR COMMUNICATIONS NETWORKS WITHOUT ANY MODIFICATION ON GROUND

CROSS-REFERENCE TO RELATED APPLICATION

This application claims the benefit of and priority to European patent application number 20382369.5 filed on May 5, 2020, the entire disclosure of which is incorporated by reference herein.

TECHNICAL FIELD

The disclosure herein relates generally to wireless telecommunication. More specifically, the disclosure herein proposes a method and system for air-to-ground wireless communication in which disruptive capacities are provided to radio devices integrated in an aircraft, in order to allow the provision of new connectivity services.

BACKGROUND

High speed communications have become more and more essential in modern society as there has been an exponential increase in the demand of information exchange, leading to the evolution and expansion of cellular networks to provide this service with enough quality and competitive prices. The aeronautical field has also experienced the necessity of increasing the communications speed (binary rate) and in order to do so, very different procedures have been used. There are mainly two types of technologies used by the majority of military air forces and airlines for the aforementioned connectivity needs: Satellite Communications and Air-to-Ground Communications.

Satellite communications: Nowadays, most of the civil and military aircraft operators opt for the integration of wideband satellites communication systems for airborne wireless communications. These systems are able to provide up to few Megabits per second, nevertheless, equipment aircraft integration process and service, are very costly. Only nations with large resources are able to afford this kind of systems for their military platforms, whereas regarding to commercial aircrafts only a few airlines in some of their long distance flights decide to offer this service as the high price per Megabyte drastically reduces the number of potential customers. Furthermore, each company is proprietary of its own solution with its own satellite constellation and frequency band, so there is no compatibility between systems. In case that connection to the networks of two or more service providers is required, it implies the integration of their corresponding systems, increasing the cost, weight and complexity of the communication system.

In a near future it is expected that new low Earth orbit (LEO) satellite communication systems are ready for operation, whose only purpose is to provide wideband Internet service worldwide. Once this LEO network is totally deployed and fully operational, it is expected that any platform may access to the service; nonetheless, the lack of knowledge about system performance, the number and size of equipment to be integrated, the service price and an "entry-to-service" schedule, makes this solution not a current viable option.

Air-to-Ground communications: The main companies which offer airborne data service based on this technology have designed similar systems, where the aircraft stablishes a data connection with their own network whose base stations are ground allocated (around the USA and Europe respectively). Even though, these systems are based on 4G LTE standard, each company has its own proprietary solution and it is not compatible with cellular terrestrial (ground) commercial networks.

Regarding direct Air-to-Ground communication, different research studies have been performed in recent years in order to analyse and provide a viable solution to some of the main issues to be handled in a communication with cellular terrestrial networks. A common aspect of the existing prior art in this field of technology is that the terrestrial cellular networks which participate in the direct Air-to-Ground communication need a particular adapted configuration to be able perform the Air-to-Ground communication. For example, some of the existing solutions are based in the development of new base stations, specifically dedicated for connecting with airborne equipment (see for example U.S. Pat. No. 8,831,601B2).

In this way, in order to achieve an uninterrupted communication among the aircrafts and the base stations, different methods for the handover between contiguous antennas have been analysed in the prior art, always relying on adaptation of the ground base stations (for example, with an specific beamforming in the ground base stations for connecting with aircrafts, as stated on patent application WO2017201383A1). Or, in order to resolve the Doppler Shift problem due to the high speed of the aircrafts, prior art solutions depend on a specific interaction between the aerial and ground segment and on knowing in advance the position of the base stations involved.

Thus, current existing airborne wireless communications are suboptimal and, in case of air-to-ground communications they require deep modifications in the ground segment. Airborne connectivity needs to evolve, so it makes necessary to provide new aeronautical communication services able to satisfy the increasing communications services demand, especially of the users inside the aircraft cabin, with broad interoperability with other communications systems and with reasonable costs for the users.

SUMMARY

The disclosure herein solves the aforementioned problems and overcomes previously explained state-of-the-art limitations by proposing a method and system for Air-to-Ground communications which allows the integration of the aircraft communication with a ground network, specifically with a terrestrial cellular communications network (for example, mobile communications networks of any type as, for example, a 4G or 5G mobile communications networks) without the need of making any modification in the ground network.

Current aerial communication systems are based on analogic unidirectional voice calls and highly reliable, low throughput data links; whose main purpose is to assure a worldwide interoperable system that allows the safe command, management and control of the platform in the civil airspace. However, these systems do not have the capacity for providing the data rate needed for new services required by the customers and the airlines, such as passenger wideband connectivity, real-time aircraft monitoring as well as mission update, and predictive maintenance among others. On the other hand, terrestrial cellular communications networks have experienced an exponential development in recent years because they are widely spread as they are based on international standards and because they have made up many new services as the throughput they provide, increases.

The disclosure herein combines these two areas, which have not been initially designed for being interoperable between them, allowing an aircraft while is flying, to be connected to a terrestrial cellular communications network without making any modification on it. From the ground network point of view, the aircraft connection will be equal as any other user that is connected on ground. As a result, the aircraft will get a low cost high speed data link as the data fare will not be higher than the one paid by any other user on ground and no network maintenance is needed; whereas the Mobile Network Operator (MNO) does not need to make any investment for adapting its infrastructure to this new service. It implies big advantages for the aircraft operators, as they can widely increase the connectivity throughput at very low prices and Mobile Network Operators do not require any hardware or software update of their networks for providing this service.

The special mobility conditions of the aircraft make mandatory the design of an entire aerial segment in order to get the data communication feasible (solving some of the key issues, as for example, the handover between ground base stations), assuming that no modification or adaptation can be carried out in the ground segment. In other words, in order to make this disclosure herein feasible, some modifications in the aircraft communication system are required, mainly in two aspects: airborne radio and airborne antenna.

An airborne radio will be in charge of managing and executing this new service, for what a waveform needs to be loaded with the functionality. The possibility of uploading a new waveform on the airborne software defined radio (SDR) makes it appropriated for this disclosure herein, without the obligation of integrating new equipment in the aircraft (this is only a possible embodiment, in alternative embodiments other aircraft devices or a new specific radio device can be used).

An airborne antenna will be in charge of focusing the radiofrequency power to the most appropriated direction in each moment with the aim of making the Air-To-Ground communication feasible with the best propagation conditions (this can be done by the existing airborne antenna or by a specific antenna) and reduce as much as possible the interferences produced by the aircraft on the terrestrial network. Particularly, in the proposed embodiments, the airborne antenna will adaptively create several concurrent radiation patterns: one for maintaining the current connection with the serving cell (with the serving base station) and the others to search the next suitable cell (the next suitable base station) for handover. Thanks to this specific radiation pattern for searching the next cell for handover (together with appropriated algorithms for the cell selection), the handover problem will be efficiently solved.

According to a first aspect, the disclosure herein proposes a method for Air-to-Ground communications, the method comprising the following steps performed by an electronic system located in an aircraft:

a) establishing a communication with a ground base station of a terrestrial cellular communications network;

b) while maintaining a beam of an antenna array of the aircraft pointed to the ground base station, scanning the space in different spatial directions using several beams of the antenna array;

c) selecting a candidate base station for handover based on one or more signal parameters of signals received, as a result of the scanning, from ground base stations belonging to the terrestrial cellular communications network or to a different terrestrial cellular communications network;

d) causing a handover of the connection from the ground base station to the selected candidate base station, at a moment determined based at least on signal parameters of signals received from the ground base station; where the beams are generated by digital beamforming techniques applied by the system, to N radiating elements of the antenna array, where N is a design parameter, N>1.

In an embodiment, for signals received by the system from any ground base station, the system calculates the Doppler frequency shift of the received signal and corrects the frequency shift in the received signal according to the calculated Doppler frequency shift; and for signals to be transmitted from the system to ground base stations, the system estimates the Doppler frequency shift to be experimented by the signal when received by the corresponding ground base station and the system shifts in frequency such signal to be transmitted to pre-compensate the estimated Doppler frequency shift; where the calculation and the estimation of the Doppler frequency shift is made based at least on one of the following: the aircraft velocity, the aircraft location and the corresponding ground base station location.

In an embodiment, for signals to be transmitted from the aircraft to any ground base station, the time advance is corrected, by the system, based on the aircraft location and the corresponding ground base station location.

The location of the corresponding ground base station may be estimated from the pointing angle of a beam of the antenna array pointing to the corresponding ground base station.

Previously to step a), a scanning in different spatial directions may be performed in order to select the ground base station for establishing a communication based on signal parameters of the signals received, as a result of the scanning, from different base stations in the different spatial directions.

The spatial directions scanned may be determined based on location of ground base stations estimated by the aircraft or stored in a database in the aircraft.

The spatial directions scanned may cover all the ground-oriented spatial directions from the aircraft, with a certain pre-established separation between the scanned spatial directions.

In an embodiment, the scanning of step b) starts when a handover triggering event happens. The handover triggering event may be based on the quality of the signal received by the serving base station being below a certain threshold.

In an embodiment, step b) comprises:

b1) receiving one or more signals from one or more base stations in each scanned spatial direction;

b2) performing a Doppler frequency shift correction in each received signal from each base station;

b3) demodulating and decoding each signal obtained in b2); and step c) comprises: for each signal obtained in b3), measuring one or more signal parameters from each signal and selecting the best candidate base station for handover, based on the comparison of the measured signal parameters.

The moment to perform the handover may be determined based at least on a comparison of the signal parameters of the signal received from the ground base station with the signal parameters of the signal received from the candidate base station.

The electronic system may comprise a software defined radio equipment.

According to a second aspect, the disclosure herein proposes systems to perform any of the above stated methods. For example, it is proposed a system for Air-to-Ground communications, being located in an aircraft and comprising:
- an antenna array, comprising N radiating elements, N>1, where N is a design parameter;
- more than one radiofrequency, RF, transmitter and receiver for transmission and reception of signals, through the antenna array, to/from ground base stations of one or more terrestrial cellular networks;
- a digital signal processing module (subsystem comprising one or more electronic processors) configured to:
  - establishing a communication with a ground base station of a terrestrial cellular communications network;
  - while maintaining a beam of an antenna array of the aircraft pointed to the ground base station, scanning the space in different spatial directions using a several beams of the antenna array;
  - selecting a candidate base station for handover based on one or more signal parameters of signals received, as a result of the scanning, from ground base stations belonging to the terrestrial cellular communications network or to a different terrestrial cellular communications network;
  - causing a handover of the connection from the ground base station to the selected candidate base station, at a moment determined based at least on signal parameters of signals received from the ground base station, such signal parameters being included in measurement reports sent by the system to the ground base station; where the beams are generated by digital beamforming techniques applied to the N radiating elements of the antenna array.

The system may comprise a software defined radio equipment of the aircraft.

In a last aspect of the disclosure herein, a computer program is disclosed, comprising computer program code adapted to perform the steps of the described methods, when the program is run on one or more processor(s) of a network entity of an OFDMA network, the processors(s) being for example a computer, a digital signal processor, a field-programmable gate array (FPGA), an application-specific integrated circuit (ASIC), a micro-processor, a micro-controller, or any other form of programmable hardware. In other words, a computer program comprising instructions, causing a computer executing the program to perform all steps of the described method, when the program is run on a computer. A digital data storage medium is also provided for storing a computer program comprising instructions, causing a computer executing the program to perform all steps of the disclosed methods when the program is run on a computer.

These and other aspects and advantages of the disclosure herein will be apparent from and elucidated with reference to the embodiments described hereinafter.

BRIEF DESCRIPTION OF THE DRAWINGS

For the purpose of aiding the understanding of the characteristics of the disclosure herein, according to a preferred practical embodiment thereof and in order to complement this description, the following figures are attached as an integral part thereof, having an illustrative and non-limiting character.

DETAILED DESCRIPTION

The disclosure herein proposes a method and a system to provide an aircraft with Air-to-Ground communications through one or more terrestrial cellular communication networks (e.g. a mobile communications network using any mobile communications technology as 3G, 4G LTE, 5G or beyond, regardless it is a FDD or a TDD communications system).

Figure 1:
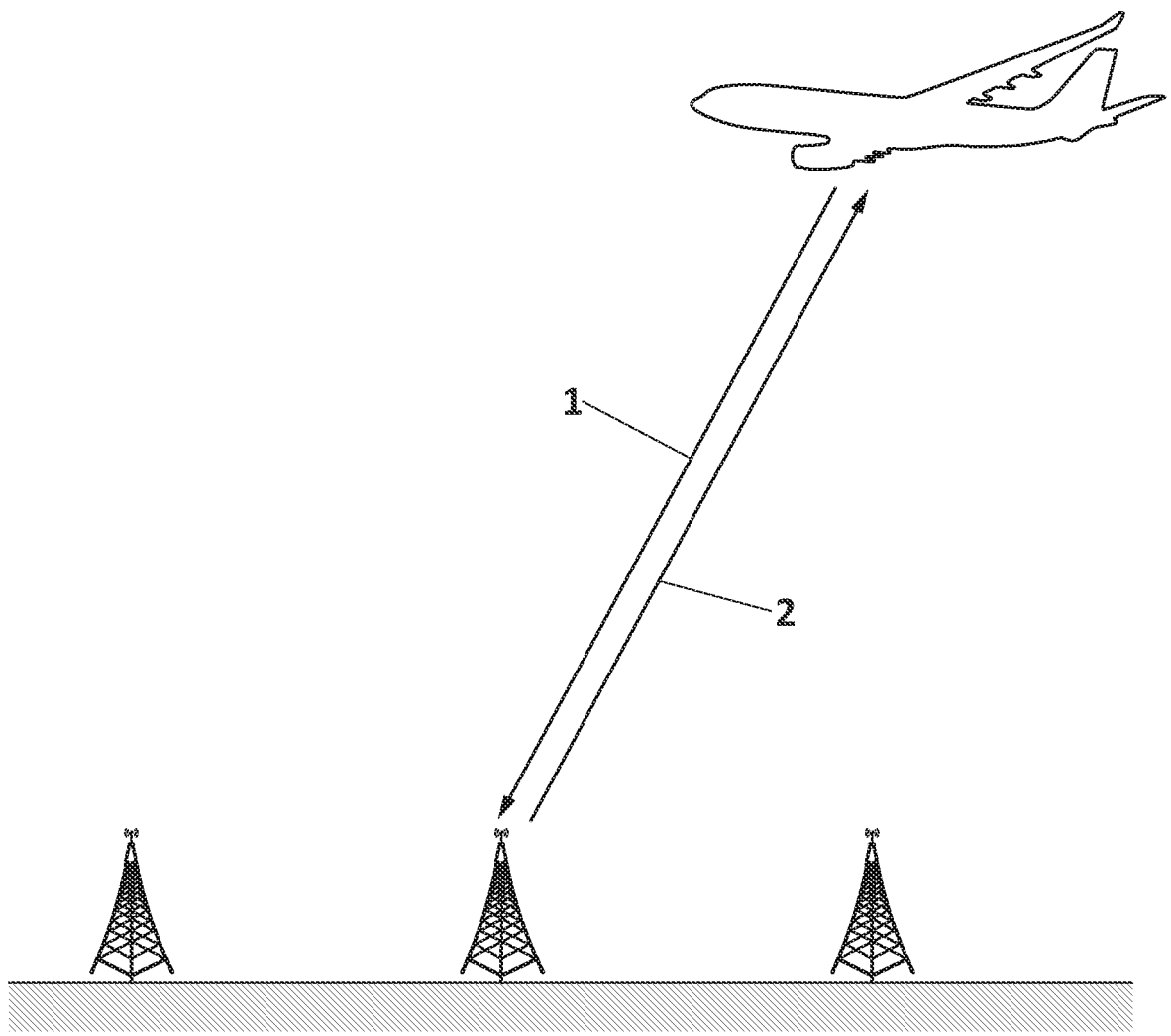
FIG. 1 depicts a schematic diagram showing air-to-ground communication between an aircraft and ground base stations, according to an embodiment of the disclosure herein.

One of the main advantages is that the disclosure herein is carried out in the aircraft; in other words, all the modifications to carry out the disclosure herein are made in the aircraft and no modification is necessary in the terrestrial cellular communication network (ground network) so any existing standard cellular communication network of any MNO may be used without requiring any modification. In the proposed solution (see FIG. 1), the aircraft acts as an user equipment (UE) for the terrestrial cellular communications network; thus the uplink (1, physically in the downward direction when the aircraft is flying) will be the radio link (radiofrequency link) from the UE (the aircraft) to the ground base station (the base station of the terrestrial cellular communication network) and the downlink (DL, 2) will be the radio link (physically in the upward direction when the aircraft is flying) from the ground base station to the UE (the aircraft). Usually, the term user equipment (UE) in cellular communications networks is referred for mobile terminals on ground; however, in this text the UE is referred to an airborne communications terminal, as the disclosure herein is focused in Air-To-Ground communications.

Inside the aircraft cabin, passengers who want to communicate using the terrestrial cellular communications network, must connect their communications terminals to an internal (e.g. WiFi) network of the aircraft. For downlink transmissions, the internal network will be in charge of receiving the information sent by the passenger's terminals and the information will be sent by the proposed aircraft system through the established Air-to-Ground link. For the uplink, the process would be the opposite: the information for the passengers' terminals inside the cabin will be received though the Air-to-Ground link by the proposed aircraft system, and the internal network will be in charge of delivering each information package to the appropriated passenger's communication terminal.

That is, from the point of view of the terrestrial cellular communications network, the proposed aircraft system acts as a single user (a single user equipment). The passengers inside the aircraft which want to communicate through the terrestrial cellular communications network, will have to connect their communications terminal to an access point inside the aircraft and the proposed aircraft system will establish the Air-to-Ground link with the terrestrial cellular communications network as a single user equipment.

The base station may be a BTS (Base Transceiver Station), a Node B, an eNode B, a gNode B and generally speaking any base station used by the ground network (the terrestrial cellular communications network), whose type which will depend on the communications technology used by the ground network. From now on, the terms base station or ground base station will be equally used to refer to the same concept, a base station of a terrestrial cellular communications network.

Figure 2:
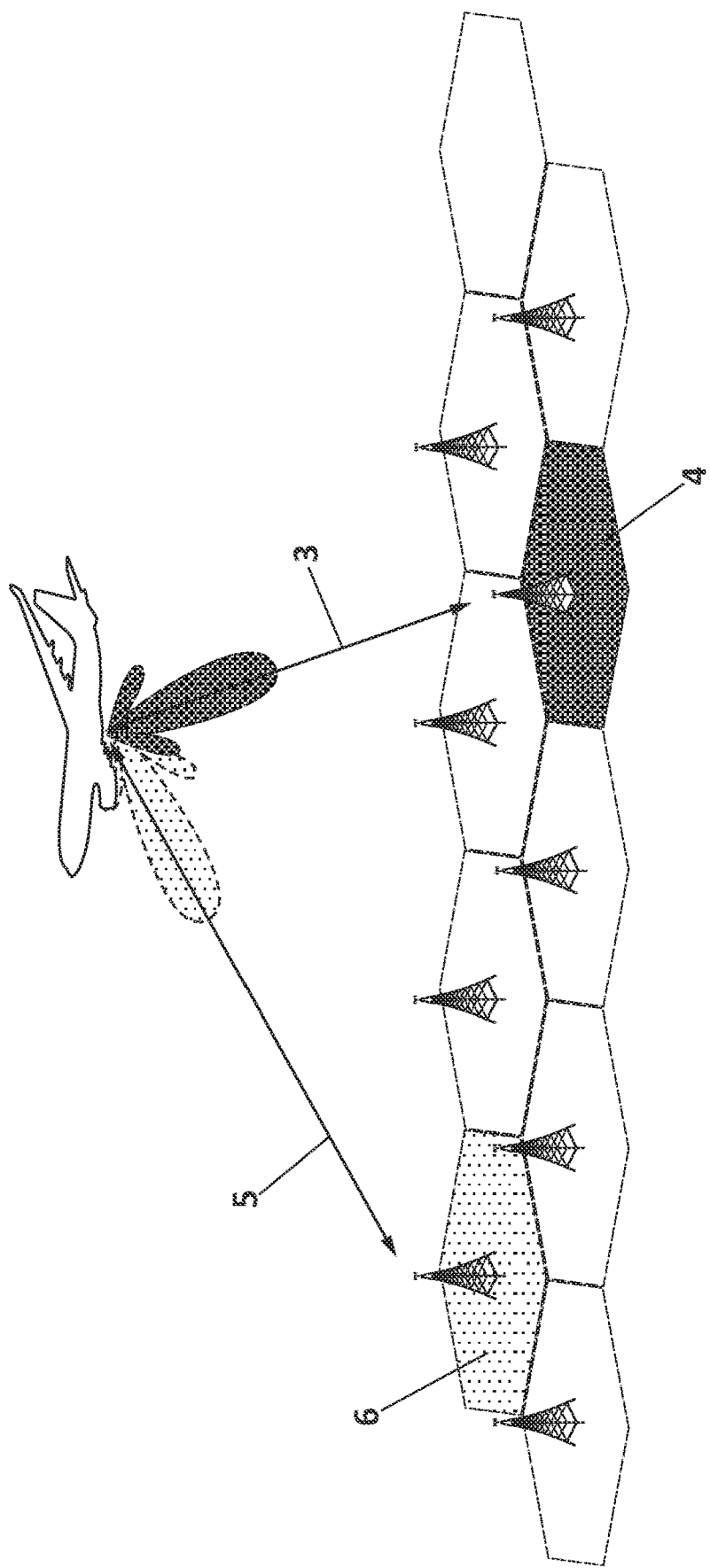
FIG. 2 depicts and schematic diagram showing aircraft connectivity and radiation patterns, according to an embodiment of the disclosure herein.

The disclosure herein provides an on-board system to allow the communications with a (cellular) ground communications network. As previously explained, in order to keep the communication between the aircraft and the ground network, one of the key constrains (mainly due to the aircraft speed and height, which may be over 5000 m) is the handover process in mobile communications, that is, the handover from one ground cell (belonging to a certain ground base station) to another ground cell (belonging to another ground base station). As it is shown in FIG. 2 (which illustrates the aircraft connectivity during the flight), in order to solve this problem, the proposed communication system will support at least two simultaneous radiation patterns: one for maintaining the current connection (3) with the serving cell (4) and another one (or more) to search (5) the next cell (6) for handover which may, due to the high aircraft speed and height, may be an adjacent cell or another not-adjacent cell (physically separated). Thanks to this secondary radiation pattern (or simultaneous radiation patterns) of the aircraft antenna, a suitable cell (and consequently a suitable base station) for handover can be found even it is far away from the serving cell (in the serving base station).

Figure 3:
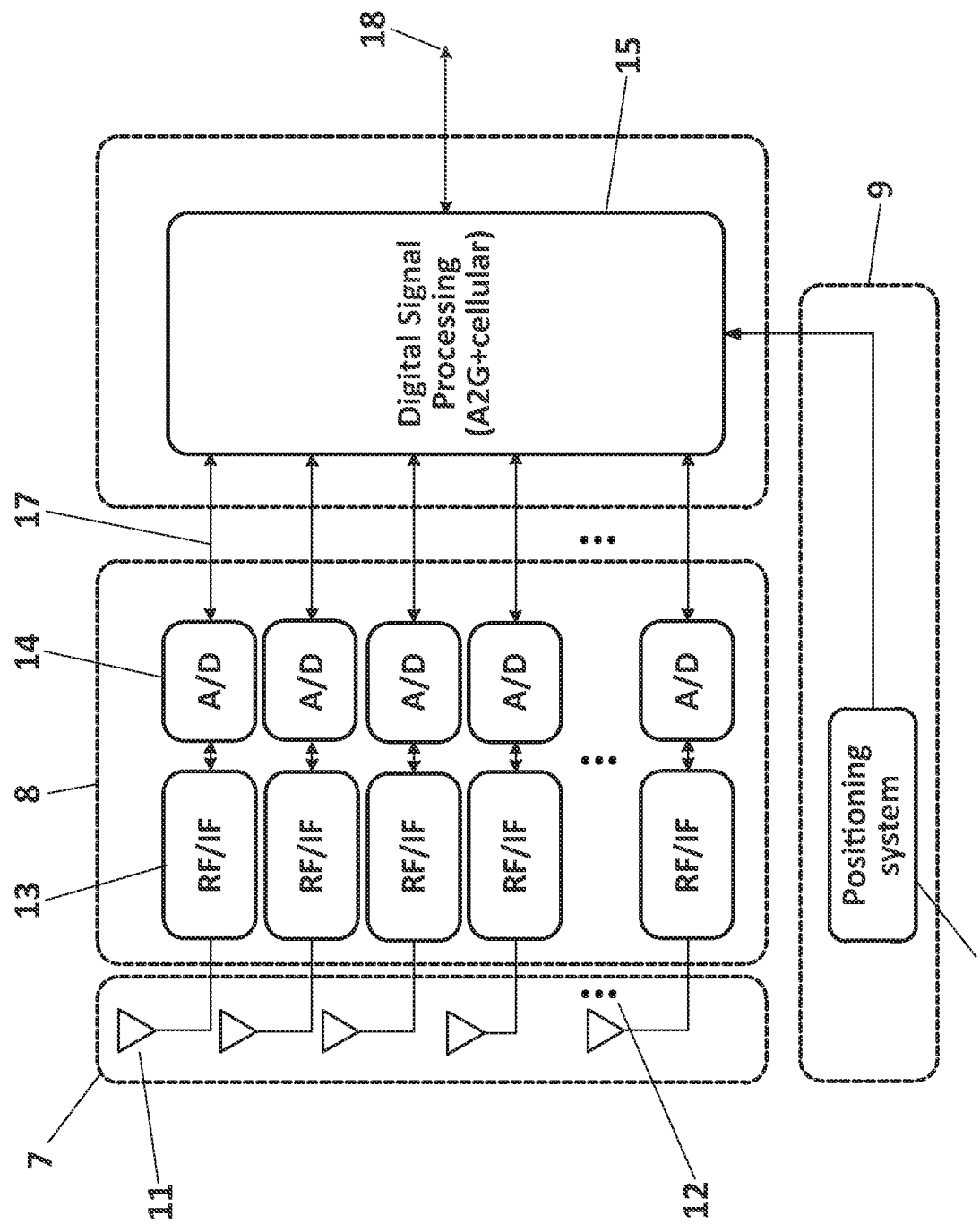
FIG. 3 shows a block diagram of the aircraft system for Air-to-Ground communication, according to an embodiment of the disclosure herein.

In FIG. 3, the main blocks (functional elements) of an Air-To-Ground communications airborne system are shown, grouped in different subsystems, according to an embodiment of the disclosure herein. Even though, for simplicity and clarity, the functional elements are shown in FIG. 3 as isolated blocks, the function of each block can be performed by the same hardware elements (e.g. the same processor) or by different hardware elements (e.g. different electronic processors). Analogously, the element(s) performing all the different functions can be co-located (in a single hardware unit) or can be distributed in different separated interconnected hardware units. FIG. 3 shows, without limitation purposes, a proposed embodiment; not all the blocks (functional elements) shown in FIG. 3 are mandatory in all the embodiments.

In order to overcome the handover constraints (and the rest of constraints presented in airborne communications with respect to the typical ground cellular communications) only making modifications in the airborne radio segment and, in order to allow high speed and high quality air-to-ground communications according to an embodiment of the disclosure herein, the proposed aircraft communications system comprises the following subsystems (as shown in FIG. 3):

Antenna array (7): The radiation pattern of the antenna array allows the correct radio link establishment and interference reduction to and from other ground base stations. The array is composed of a certain number, N, of radiating elements (11), also called antenna elements (from the first radiating element to the N radiating element (12) with N>1, where N is a configuration parameter). Depending on the antenna configuration (number of elements, type of elements, geometry, weights) the radiation pattern provides gain and one or more directive beams. As previously explained, there will be a radiation pattern (beam) pointed to the currently serving base station and one or more secondary radiation patterns (beam or group of beams) searching for a suitable next base station for handover. The system is able to real-time adaptably point to the desired base station(s) based on the weight computation of each radiating element of the array, which in a preferred embodiment is carried out at digital level (digital beamforming); this (digital) beamforming is performed on-board by the proposed system. No mechanical beam steering is considered in the preferred embodiment.

The disclosure herein proposes the use of (preferably digital) three dimensions (3D) beamforming technology in the aerial segment, not used in the existing prior art for Air-to-Ground communications. This technology implies the design of the antenna array composed by several radiating elements in a particular topology for optimizing not only the beam pointing (to allow a double radiation pattern, one for the serving base station and one for searching a better base station for handover) but also for optimizing the interference cancellation, and the SNR of the received signal. Preferably, this antenna array will be completely passive.

Radiofrequency (RF) transmission and reception (8). It comprises one or more transceivers (transmitter/receiver). In the receivers, each RF input signal coming from the antenna array is received and, according to a preferred embodiment of the disclosure herein, amplified, filtered and down converted (to a lower frequency) to an intermediate signal (13), that is, to an analog signal with an intermediate frequency. From the intermediate analog signal, the corresponding analog/digital converter (14) obtains a digital signal to be further processed (15). In the transmitters, the digital signals are converted to analog signals (14) and then up converted (to a higher frequency), filtered and amplified (13) to deliver the output RF signals to the antenna array for transmission. In the embodiment shown in FIG. 3, there is a RF transceiver (transmitter/receiver) for each antenna array element (so there are N RF transceivers) in order to allow the digital beamforming. However, other beamforming techniques, such as analog and hybrid, may be supported by the system. In such cases it is possible to have less RF transceivers than antenna elements, depending on the hardware configuration.

Positioning information (9): As it will be later explained, the proposed communications solution needs aircraft positioning information; this positioning information may include, for example one or more of the following parameters: the location of the aircraft (e.g. coordinates), altitude, attitude, speed and any other. This information can be obtained from a positioning system (16) on-board the aircraft (specific for the proposed communications system or already existing in the aircraft). For example, a Global Navigation Satellite system (GNSS) receiver (as a GPS receiver), an inertial navigation system or any other type of positioning system or a combination of them. Usually, such positioning information is received from system(s) already existing in the aircraft (through internal communication) as the aircraft positioning information (location, speed . . . ) is needed for the aircraft own navigation system; in other words, rather than from an specific positioning system, the positioning information can be obtained from the already existing aircraft positioning system (necessary for aircraft navigation).

Digital signal processing (15): This is the key part of the proposed system. Among other tasks, the cellular standardization waveform that allows the Air-to-Ground communication with the terrestrial cellular communications network (for example, a 3G, LTE, 4G, 5G or any other type of mobile communications network) is performed by this subsystem.

In reception, the inputs of this subsystem are the signals (17) from each antenna element after being pre-processed (amplified, filtered, frequency converted and digitalized) by the RF transceivers and, preferably, also the positioning information. With the inputs, all the tasks needed to support cellular communication are performed (as the received signals come from a cellular communications network) in order to extract the data (transmitted to the aircraft by the base station in communication with the aircraft) from the signals received from the terrestrial cellular communication network, which is given (18) to other aircraft systems for distribution; the cellular communications standard tasks may include synchronization, demodulation, decoding, channel information extraction, etc. This subsystem also performs all the needed modifications to the cellular communications standards, for compensating the special conditions (constraints) that appear in the Air-to-Ground communication due to the aerial environment (high speed and attitude).

In transmission, this subsystem receives the data (18) to be transmitted from the aircraft, makes the necessary modulation, coding and mapping according to the cellular communication standards (with the required modifications due to the special conditions due to the aerial environment) and gives the resulting digital signal (17) to the transceivers (where it is analogized, frequency converted, filtered and amplified, according to an embodiment of the disclosure herein) and, from there, is given to the antenna array for transmission.

In order to perform the above explained functions, with the aim of achieving a data link with the terrestrial cellular communications network, new radio capabilities (which usual airborne radios do not have) are needed in the proposed Air-to-Ground communications solution. These new radio capabilities can be provided by an electronic system for the new radio capabilities or can be provided by a system already existing in an aircraft but specially modified for providing these radio capabilities. In this latter case, the core of this system can be the airborne software defined radio (SDR) installed in most of the current aircrafts, with should be designed/configured with increased computational capacities in order to support these new capabilities. An airborne radio (in a preferred embodiment, a SDR) designed with these features is novel in aerial communications and provides new capabilities never before explored in Air-to-Ground applications. Its main capabilities, according to an embodiment of the disclosure herein, should be:

Software (SW) load: The airborne radio (also called airborne radio system) will be in charge of managing the cellular communication standard (which should be loaded in its memory) in order to be able to communicate with through a terrestrial cellular communications network(s). The radio should be fully programmable.

Computing capacity: The airborne radio may be equipped with a central CPU for managing the standard cellular waveform and a collection of FPGAs (one per RF port) in order to increase the computational capacity for linear signal processing.

RF Front-End (RFFE): The airborne radio should be capable of managing more than one RF port coherently or separately. The radio should be able to perform digital beamforming and/or apply diversity gain or spatial multiplexing algorithms.

Digital beamforming: The airborne radio should be capable of managing the phase of the different RF ports for digital beamforming techniques. Actually, one of the tasks of the proposed airborne radio system is to entirely manage the antenna array, being in charge among other things of adapting the amplitude and phases of each radiating antenna element for creating and managing one or more beams in parallel (simultaneously) depending on the operation performed.

The embodiments of the disclosure herein allow Air-to-Ground communication with a terrestrial cellular communications network (ground network) without any modification of the infrastructure of the ground network already deployed. This fact implies that the waveform loaded (transmitted or received) in the airborne radio shall be interoperable with the ground network, however, the special mobility conditions of the aircraft makes that some of the parameters used by the cellular communications standard get out of norm and the communication is not feasible (unless some specific modifications are made). The airborne radio equipment (also called only airborne radio) performing the disclosure herein should be modified (in case of a SDR, the cellular communication standard software loaded in the SDR) accordingly to the mobility conditions with the aim of being able to establish and maintain the communication link with the ground segment (the terrestrial cellular communications network). This novel scope, in which the airborne radio is in charge of processing all the modifications in the standard procedure, for making use of a terrestrial (ground) network already deployed for other purposes, has never been seen before in aerial communications. Some of the tasks that may be performed (and, therefore, the modifications which should be made in the airborne radio) are related to:

Mobility Management: This involves all the tasks that a radio equipment (in the user equipment) needs to perform in order to get connected to a base station and ensure a link without interruptions, reselecting a new cell (handover) when the current signal is weak. In the disclosure herein, the handover process of the ground network is not modified and the airborne radio tries to keep the connection to a serving cell (belonging to a server base station) as much time as possible in order to avoid a handover every few seconds (due to the high speed of the aircraft). This process will improve the overall system throughput, as only a small amount of time is used for this signalling and control operations.

According to an embodiment of the disclosure herein, mobility management process starts scanning the space by the airborne radio, using digital beamforming techniques, in order to find out the "best" cell and, consequently, the "best" base station (BS) at that moment in time. This "best" base station may be selected according to different criteria; in an embodiment, the cell/base station providing the service with the highest signal quality is selected (but any other criterium can be used). Once the "best" base station is selected, a communication link is established through the base station (serving base station) and the airborne system keeps one of the beams (or group of beams) of the antenna array pointing towards that selected base station in order to maintain the connection as much time as possible, while it monitors (based on digital beamforming) the incoming signal to avoid starting the handover process due to fast signal fades. In an embodiment, when it is detected that the signal power received from the serving base station (from the serving cell) is close to a pre-established boundary (or when any other pre-established triggering event occurs), the radio equipment starts the handover process with a new cell (probably belonging to a new base station). This is done because in parallel with the current connection, the radio performs continuously a search process to find the next possible best cell according to a selection criteria (for example, a cell whose signal is received with a better quality than the serving cell; any other criteria can be used) scanning the space using a group of beams while the previous established link is kept. The entity in charge of commanding and managing handovers is the Base Station, so in order to avoid undesired handovers, in an embodiment, the airborne radio will send false measurement reports when they are required by the Base Stations. The rationale behind this is the fact that the Base Station decides the next cell to be connected to, based on the User Equipment signal measurements of the surrounding cells to the one that provides the service (serving cell), i.e, the UE may be requested to send periodically measurement reports with the measurements of the accessible cells. The proposed system is intended to avoid multiple handovers and tries to connect the same cell as long as possible, in order to do this, the airborne radio has to false the reports (for example, sending an average of the measurements previously made by the radio to the Base Stations), in order to maintain the connection and perform the handover with the desired cells avoiding that a punctual fade in the signal measurement, make the Base Station starts the handover process.

When the desired next cell is found by the proposed system, in an embodiment, the airborne radio will release a handover event message with a measurements report to the Base Station that is providing the service, in which it will be indicated the weakness of the signal received power of the current link, and the good signal level received from the Base Station to which it is intended to switch. The aim is to cause the serving Base Station to start the handover process to this new cell previously selected by the UE. In an alternative embodiment, this search for a new cell is not continuously performed but it is triggered by some triggering event.

In other words, the mobility management process proposed by an embodiment of the disclosure herein comprises: establishing a link with a base station for communication (serving base station) keeping one first beam of the antenna array pointed to the serving base station; and searching with other (concurrent) beams the next possible cell to be connected to. As another alternative, in an embodiment, when a certain triggering event happens (the signal power received, the quality or the SNR of the signal received from the serving base station is below a pre-established threshold; this is only an example and any other triggering criteria can be used or even, in an embodiment, the search can be continuously done) the radio system starts a search process of a new cell according to a selection criteria (for example, a cell whose signal is received with a better quality than the serving cell), scanning different spatial directions using several concurrent beams (which may be pointed in a different direction than the first beam) of the antenna array while the previous established link is kept (that is, the first beam is kept pointed to the serving base station). By using concurrent beams, it is meant that the system checks the signal received through different beams in parallel (by digital beamforming in reception) to select the next cell. When the new cell is selected (probably belonging to a different base station), the radio will force the handover process to this new cell/base station modifying the measurement reports (as previously mentioned), so a link is established with this new base station and this new base station becomes the serving base station (and the mobility management process starts again). This new base station selected from handover, usually will not be adjacent to the serving base station (and sometimes may be very far away from the serving base station) due to the aircraft high velocity and height. And this new base station may belong to the same terrestrial cellular communications network as the serving base station or to a different one.

This novel handover method allows the connection with the commercial existing ground networks, as do not require any modification on them, all the process is performed by the airborne radio. Other existing solutions implements proprietary handover solutions that imply a software and/or hardware base station update.

Doppler Shift: Due to the aircraft speed, the Doppler shift induced into the signal is higher than the maximum Doppler shift allowed in the cellular network communication standards. The airborne radio must estimate (modifying its software in case of being a SDR) the Doppler Shift according to the aircraft speed and the estimation of location of the base station that is providing the communications service. This estimated Doppler Shift would be used by the airborne radio to compensate this frequency shift in reception and, to pre-distort the signal in transmission (that is, to modify the signal before transmitting it), in order to assure that the frequency shift of the signal received by the base station accomplishes the standard. Using digital beamforming techniques, the airborne radio keeps pointing to the serving base station and gets distance estimation according to the phase variation of its pilot and synchronization signals. The proposed technique corrects Doppler shift in both directions (uplink and downlink) processing the signal only in the aircraft, whereas most of existing system requires that each segment (ground segment and aerial segment), compensates its own frequency shift.

Time Advance (also called timing advance): In the cellular communications networks, this known procedure compensates the propagation delay in the uplink between user equipment and base station. This compensation is made to prevent signals transmitted by distant user equipment from overlapping at the receiver with those transmitted by nearby user equipment. Time advance parameter has a maximum value (threshold) defined by the standard that determines the maximum radius of the cell. In the disclosure herein, the radius of the cell is usually bigger than the maximum defined by the threshold in the standard because of the bigger distance between the serving base station and the user equipment (aircraft) due to aircraft altitude. Hence, in the disclosure herein, the airborne radio must estimate the real distance from the aircraft to the base station (based, among other factors, in the aircraft positioning information) and pre-compensate the signal timing in order to assure that the signal is received by the base station within the expected period (regardless the big distance between the base station and the aircraft). In existing Air-to-Ground communication systems, ground base stations are configured for allowing huge cells and no pre-compensation of the time advance is needed.

Interference Mitigation: The interference received by the airborne radio is higher than the one received by a ground user due to the amount of base stations that the aircraft is able to receive when flying. In addition to digital beamforming techniques that avoid interferences coming from base stations away from the pointing direction, some active mitigation actions as interference cancellation algorithms may be implemented in the airborne radio system. Similar case applies also from aircraft to ground. Usually, airborne radio does not include this kind of algorithms for interference mitigation, so this novel technique allows a new certain number of services in the aircraft not feasible with current airborne radios.

Figure 4:
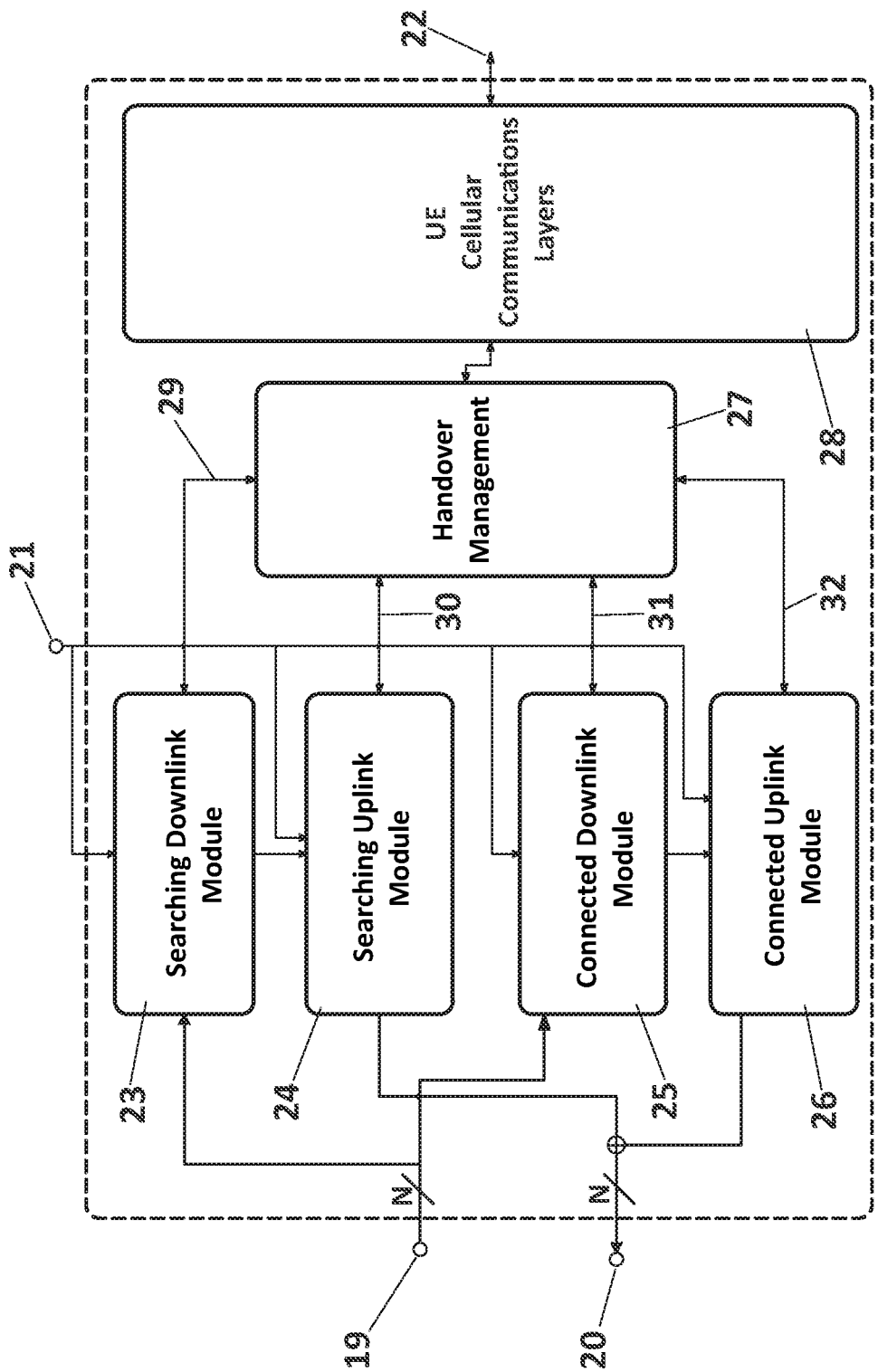
FIG. 4 shows a block diagram of the digital signal processing subsystem of the aircraft system for Air-to-Ground communication, according to an embodiment of the disclosure herein.

FIG. 4 shows the main blocks (functional elements) of the digital signal processing subsystem (15) of the aircraft, according to an embodiment of the disclosure herein. FIG. 4 shows, without limitation purposes, a proposed embodiment; not all the blocks (functional elements) shown in FIG. 4 are mandatory in all the embodiments. Those modules will carry out the signal processing tasks to allow the aircraft communicate with the ground (terrestrial) cellular communications network.

The digital signals (19) from the RF receiver (8), as well as the positioning information (21), are sent to both the Searching Downlink and Connected Downlink (sub) modules (23 and 25, respectively). First, in the Searching Downlink module (23), the on-board user equipment is (continuously or triggered by a certain triggering event) looking for the next cell to be connected when the handover takes place. In order to do that, this module measures the signals received from different ground cells (received through several concurrent antenna beams which scan the space while another antenna beam keeps pointing the serving base station). Information about the locations of the base stations of the ground network (previously estimated or provided by the ground network) could be also used in this process (this information may be stored in an aircraft database) to simplify the calculations and enhance the performances; in any case the use of this information and database is not mandatory.

As a result, the output of this module (the selected next cell/base station for handover) is sent (29) to the Handover Management module (27), where all the data from the searching and connected modules are treated. Based on this information from the Searching Downlink Module and on information about the signal from the serving base station (received from the Connected Downlink Module 31), this Handover Management module will decide whether the user equipment needs to change to the next cell (that is, whether a handover should be performed); this decision can be done based on the power or other QoS (Quality of Service) indicator of the received signal (from the serving cell and/or from the selected next cell).

The Handover Management module (27) interacts with the cellular communications layer (28) of the User Equipment in the aircraft to configure the parameters needed to perform the handover. Two modes of working are allowed: 1) perform the handover with the same user SIM (Subscriber Identity Module) card or 2) performing the handover using a different user SIM, that is, establishing the new connection with another user SIM. In this latter case, even though for simplicity of the explanation, in the present text it is going to be called a handover, strictly speaking a handover of the connection of the same user is not performed (because the user SIM changes) but the old connection of the old user (the previous user SIM) is finished and a new connection of a new user (a new user SIM) is established with the selected new base station. That is, the aircraft can manage the use of several SIM user cards to increase the availability of connection. This is advantageous, for example, in the cases of roaming (for instance due to the crossing of the border between different countries) when the previous BS belonged to a network operator of a country and the selected base station for handover belongs to a network operator of another country; in those cases, according to an embodiment, another SIM card is selected for registering the "new" user equipment in the new operator whereas the aircraft is flying and is connected to the "old" operator (the network operator on the previous country) with the other SIM.

On the other side, the Connected Downlink Module (25) receives the data from the RF subsystem (coming from the serving base station) and sends (31) the data to the UE Cellular Communications Layers (28) through the Handover Management module (27). Within this Connected Downlink module digital beamforming is performed with the antenna beam connected to the serving base station that is used for the data transfer, to keep as much as possible the connection with the same ground base station (that is, the beam is adapted to point to the serving base station as long as possible in order to maintain the connection with the serving base station as much as possible). The data contained received from the Connected Downlink Module (from the serving base station) is generated as output (22) in the corresponding format needed for the data application to which the data is intended.

In the case of the transmission, the information to be transmitted (22) is received externally to the software processing module and it is converted in the data formatted according in the corresponding cellular communications standard. Then it is sent to both the Searching Uplink (24) and/or Connected Uplink (26) modules (30 and 32, respectively) through the Handover Management module (27). These two modules (24, 26) work in an analogous manner (with the same approach) as in the downlink case but applicable to the uplink, including the digital beamforming and adding the physical channels needed for the cellular communications. The output of both modules are added and sent (20) to the RF subsystem (8) to be transmitted by the antenna array, where at least one beam is used for the Connected Uplink module and at least another one beam is used for the Searching Uplink module.

Figure 5:
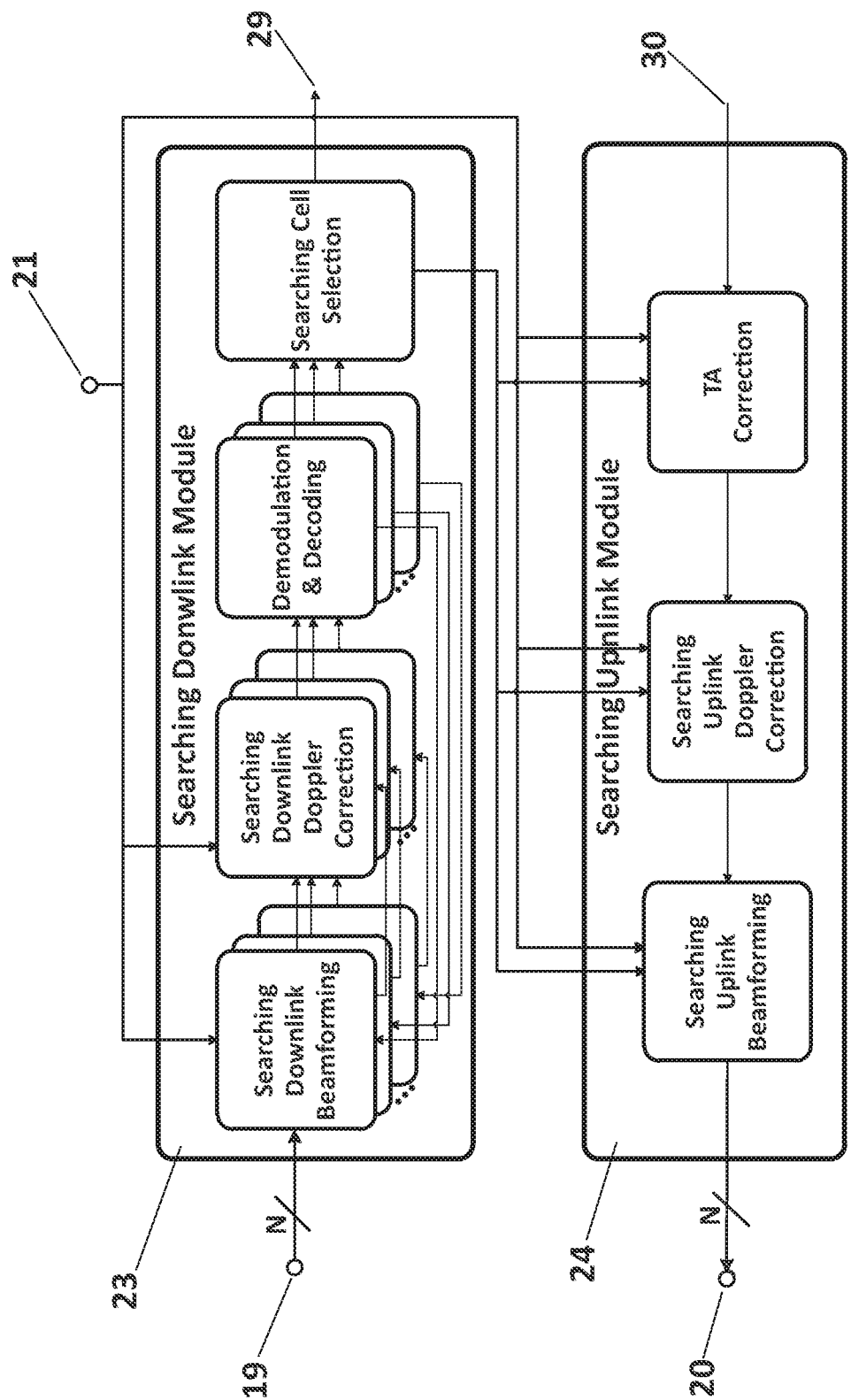
FIG. 5 shows a block diagram of the Searching Downlink and Uplink modules of the digital signal processing subsystem, according to an embodiment of the disclosure herein.

The Searching Downlink and Uplink modules have the aim of finding the best next cell (the best next base station) in the aircraft trajectory for the next handover of the connection. FIG. 5 shows the main blocks (functional elements) of the Searching Downlink (23) and Uplink (24) modules of the digital signal processing module (15) of the aircraft, according to an embodiment of the disclosure herein. FIG. 5 shows, without limitation purposes, a proposed embodiment; not all the blocks (functional elements) shown in FIG. 5 are mandatory in all the embodiments.

First, in the downlink (in the Searching Downlink Module) the signals received from the antenna array (19) through the RF receiver (8) are received and passed to the beamforming component. As it can be seen on FIG. 5, there are several blocks in parallel which work in the search of the best next cell in terms of received signal level. Each block is issued to point to each spatial direction (in elevation and azimuth) using a beam of the antenna array, as depending on the ground cell (belonging to a ground base station) configuration and location, the spatial direction of the signal received from each cell may differ while the aircraft is flying. In other words, different concurrent beams of the antenna array which scan many different spatial directions and from each spatial direction a signal from one or more cells is received and analysed. In an embodiment, all spatial ground-oriented directions are scanned (with a certain pre-established separation between the scanned spatial directions) and, in another embodiment, the spatial directions scanned are selected according to pre-stored base stations positioning information.

After the antenna pointing, the Doppler correction for the frequency may be applied. For such purpose, the aircraft positioning information (21) and the pointing angles (from the beamforming component) are needed. The Doppler Shift is caused by the shift of the signal and it depends on the radial velocity of the vector between the aircraft and the ground base station and on the frequency. Thus, the frequency, the position, the velocity of the aircraft and the pointing angle of the antenna array beam steering (which leads to the estimation of the location of the base station) are needed to correct the Doppler shift. With this information, the module calculates the Doppler shift for each received signal and corrects it. As this is made from each received signal from each cell in each scanned direction, that's why it is represented by several blocks in FIG. 5 (one for each signal).

Once the Doppler shift in each signal is corrected, signals received in each spatial direction may be demodulated and decoded in order to obtain the signal received from each pointed cell; with this demodulated and decoded signal (called reference signal), the values of the parameters (also called indicators) for making the decision of what should be the next candidate cell are obtained. Usually, these parameters are based on the signal power and/or on the signal quality (for example, the signal to interference ratio) received from each specific reference signal from each candidate cell (called RSRP Reference Signal Received Power or RSRQ, Reference Signal Received Quality). This is only an example and any other parameters (or combination of parameters) of cellular signals can be used.

The value of these parameters in each reference signal, each reference signal of the cell and the pointing direction for each signal is passed from all the parallel blocks to the Searching Cell Selection component, which based on the parameters value select the next candidate cell according to a pre-established certain selection criteria. The output information is passed to the Air-To-Ground Handover Management module (27).

Once the Handover Management module (27) decides that the Handover should be performed, the output (30) of the Handover Management module (27) is sent to the Searching Uplink Module (23), where the signals are treated (processed) before the data is transmitted, since the information is to be sent to the next candidate cell (belonging to a next candidate base station) to allow the handover process (change of the connection from the serving cell) to the cell.

In the Searching Uplink Module (23), first the signal may be corrected due to the Time Advance (TA). This procedure compensates in the uplink the propagation delay between user equipment and base station, to prevent signals overlapping from different user equipment (user terminals) at the receiver. In order to perform this Time Advance correction signals are delayed according to its distance to the receiving base station, so signals suffering larger propagation delays (that is, signals coming from terminals distant from the base station) need to be transmitted earlier so they are received by the base station within their correct time interval. This correction is only necessary in the uplink, because in the downlink, all signals transmitted by the base station are received at a given user terminal with the same propagation delay (so there is no risk of overlapping between signals). The Searching Uplink Module corrects the Time Advance based on the positioning information of the aircraft (21) and the antenna array pointing angles for the selected cell (the information coming from the Beamforming module of the Searching Downlink Module 23), which leads to compute the base station location to which the cell belongs.

After the TA correction, the signal is passed to the Uplink Doppler Correction module. In this module, Doppler correction algorithms are applied to pre-compensate the corresponding frequency shift in the signal due to the Doppler Shift; this frequency shift is previously estimated based on the aircraft velocity and both aircraft location and the location of the base station (which may be estimated from the antenna array pointing angles and, optionally, from pre-stored base stations positioning data already stored in a database in the radio equipment) to which the signal is intended (this uplink Doppler shift is calculated in a similar manner as the downlink Doppler shift).

After the TA correction and the Doppler correction, the corrected signal in time and frequency is sent to the Searching uplink beamforming algorithms in order to point the beam of the antenna array to the desired direction of the ground base station to which the signal is intended (the base station to which the selected next candidate cell belongs). The weights for each signal for each radiating element of the antenna array are applied (in order to obtain the desired beam in the desired pointing angle) and the N result signals (20) are sent to the RF subsystem (8) for transmission.

Figure 6:
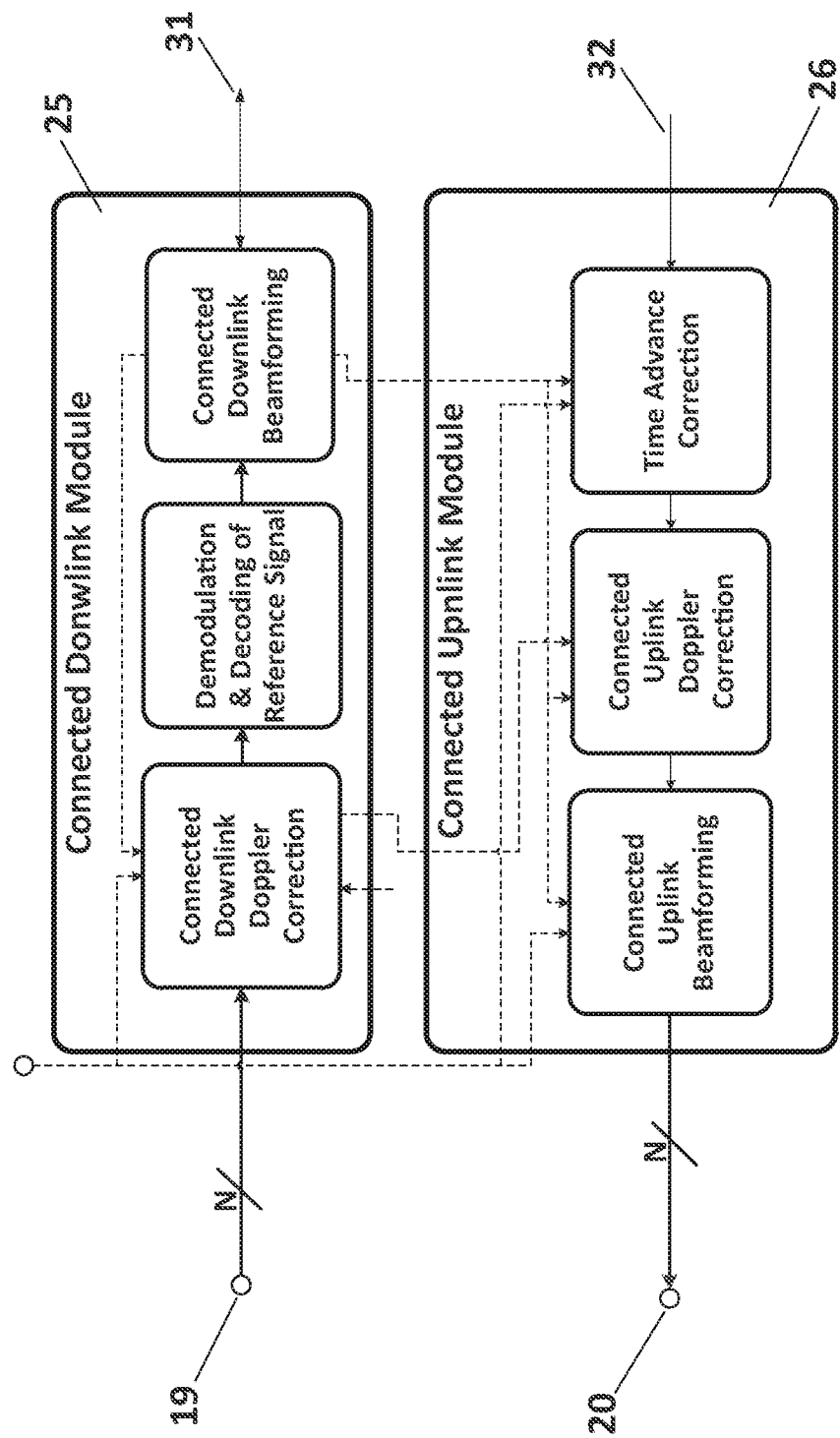
FIG. 6 shows a block diagram of the Connected Downlink and Uplink modules of the digital signal processing subsystem, according to an embodiment of the disclosure herein.

The Connected Downlink and Uplink modules have the aim of establishing and maintaining (as long as possible) the connection with the serving cell (belonging to the serving base station), achieving the required quality for communications between the user equipment in the aircraft and the serving base station. FIG. 6 shows the main blocks (functional elements) of the Connected Downlink (25) and Uplink (26) modules of the digital signal processing subsystem (15) of the aircraft, according to an embodiment of the disclosure herein. FIG. 6 shows, without limitation purposes, a proposed embodiment; not all the blocks (functional elements) shown in FIG. 6 are mandatory in all the embodiments.

As shown in FIGS. 4 and 6, besides the positioning information (21), the input for these modules are: 1) for the downlink module, the signals (19) coming from the antenna array, after being digitalized and processed by the RF module and 2) for the uplink module, the digital signals (32) coming from the UE Cellular Communications Layer (via the Handovers Management module).

In the downlink case, firstly a digital beamforming is carried out to follow the cell/base station the aircraft is connected to (the serving base station). As a result, the signal received by the antenna pointed to the connected cell direction (the base station direction to which the cell belongs) is obtained. In order to carry out this, first the reference signal has to be obtained from the incoming signals (19), which means that the incoming signals are corrected from the Doppler shift in frequency (using the same mechanism explained for the Searching Downlink Module) and are then demodulated and decoded. This output is inserted into the Connected Downlink Beamforming algorithm. The process of these three components is iterative since the beamforming and Doppler correction are linked due to the fact that the Doppler correction needs the correct pointing and the beamforming depends on the reference signal accuracy. The output of this module is the received signal steered in the serving base station direction and corrected due to the Doppler Shift. This output is given to the UE Cellular Communications Layers module through the Handover Management Module as shown in FIG. 4.

In the Uplink direction, the signals to be transmitted (32) are received in the Connected Uplink module (26) from the Air-To-Ground Handover Management module (27) and signal frequency and time corrections and beamforming process are performed, similar to the tasks performed in the Searching Uplink module (the same explanation of these tasks disclosed for the Searching Uplink module, apply here). The only difference is the type of physical and logical channels transmitted in each case, obtained from the Air-To-Ground Handover Management module (27) thanks to the Searching Uplink Module (24). In other words, different cellular communication standards will include different information in their physical and logical channels; in the proposed system, this information is sent based on the information provided by the Searching Uplink Module (24) since it provides information of which is the next cell to be connected to.

Finally, the Handover Management module (27) is the responsible of controlling both the searching and connecting process in order to ensure a soft and correct handover between the current connected cell and the next cell. It receives the information with respect to the angles, cell IDs and signal level indicators from the searching module. Then it compares the connected module signal level indicators (the indicators of the signal received from the serving cell) with the signal level indicators of the feasible base station (cell) to handover, in order to decide the correct moment to start the handover cellular process Preferably, it includes mechanisms to maximize the time of the connection to the serving cell, as well as to reduce the time for the cell transition, to avoid very short handovers, and maximize the availability. As previously explained, several SIMs can be handled for the aircraft. As for example, for the case of switching to other operator within the same country or for creating a new user registration in case of roaming in a different country.

Summarizing, the disclosure herein allows the integration of the aircraft communication with a cellular terrestrial network without the need of making any modification in the ground network. To achieve this goal, several novel techniques, not-used before for these purposes are described. For example, embodiments of the disclosure herein include novel procedures for the cell selection, cell tracking and handover. These novel procedures include, for example, searching algorithms based on pointing the antenna to different directions so signals coming from different cells in different spatial directions are received and analysed (while maintaining connection with the serving base station if there is an already established connection), selection of the most appropriated base station for connection in every moment according to the UE measurements, beamforming adaption to maximize the signal quality, interference reduction, and time advance and Doppler corrections to support the cellular communications network standards (for example, but not limited to, 4G LTE or 5G mobile communications networks).

This disclosure herein opens new communications services and markets for the commercial and military airborne field and it could be used worldwide as it can work with cellular networks based on international standards. The embodiments of the disclosure herein work with any terrestrial cellular communications network from any Mobile Network Operator, independently of whether the ground network has been adapted for the aircraft conditions or not.

The proposed embodiments can be implemented by software elements, hardware elements, firmware elements, or any suitable combination of them. Even though, for simplicity and clarity, the functional elements are shown in FIGS. 3, 4, 5 and 6 as isolated blocks, the function of each block can be performed by the same hardware elements or by different elements.

Note that in this text, the term "comprises" and its derivations (such as "comprising", etc.) should not be understood in an excluding sense, that is, these terms should not be interpreted as excluding the possibility that what is described and defined may include further elements, steps, etc.

The matters defined in this detailed description are provided to assist in a comprehensive understanding of the disclosure herein. Accordingly, those of ordinary skill in the art will recognize that variation changes and modifications of the embodiments described herein can be made without departing from the scope of the disclosure herein. Also, description of well-known functions and elements are omitted for clarity and conciseness. Of course, the embodiments of the disclosure herein can be implemented in a variety of architectural platforms, operating and server systems, devices, systems, or applications. Any particular architectural layout or implementation presented herein is provided for purposes of illustration and comprehension only and is not intended to limit aspects of the disclosure herein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims.

The invention claimed is:

1. A method for Air-to-Ground communications between an aircraft and one or more terrestrial cellular communications networks for data transmission between user equipment (UE) of passengers onboard the aircraft and the one or more terrestrial cellular communications networks, the method comprising steps performed by an electronic system located in the aircraft, the steps comprising:
   a) establishing a connection with a first ground base station of a plurality of ground base stations, the first ground base station being a part of a terrestrial cellular communications network;

generating, using an antenna array of the aircraft, a beam and pointing the beam to the first ground base station;

b) applying, while maintaining the beam of the antenna array of pointed to the first ground base station, digital beamforming techniques to N radiating elements of the antenna array to generate a plurality of beams and, using the plurality of beams, scanning space in different spatial directions for further ground base stations of the plurality of ground base stations;

c) selecting, out of the further ground base stations, a candidate ground base station for handover based on one or more signal parameters of one or more signals received, as a result of the scanning, from the further ground base stations, wherein the further ground base stations belong to the terrestrial cellular communications network or to a different terrestrial cellular communications network;

d) causing, at a moment determined based at least on the one or more signal parameters of the one or more signals received from the further ground base stations, a handover of the connection from the first ground base station to the candidate ground base station selected in step c);

for one or more signals received by the system from any of the plurality of ground base stations:
  calculating, based on at least one of a velocity of the aircraft, a location of the aircraft, and a location of a corresponding one of the plurality of ground base stations from which the one or more signals were received, a first Doppler frequency shift of the received signals; and
  correcting, using the first Doppler frequency shift, a frequency shift in the received one or more signals; and for one or more signals to be transmitted from the system to any of the plurality of ground base stations:
  estimating, based on at least one of a velocity of the aircraft, a location of the aircraft, and a location of a corresponding one of the plurality of ground base stations to which the one or more signals to be transmitted are to be transmitted, a second Doppler frequency shift that will affect the one or more signals to be transmitted when received by the corresponding one of the plurality of ground base stations; and
  shifting in frequency the one or more signals to be transmitted to pre-compensate the estimated second Doppler frequency shift;

wherein N is a design parameter and N is greater than 1.

2. The method according to claim 1, comprising:
connecting UE of a plurality of the passengers onboard the aircraft to an internal network of the aircraft;
transmitting, via the antenna array, data received from the UE of the plurality of the passengers to the one or more terrestrial cellular communications networks;
receiving, via the antenna array, data from the one or more terrestrial cellular communications networks; and
sending, via the internal network of the aircraft, the data received from the one or more terrestrial cellular communications networks to the UE of the plurality of the passengers;
wherein the aircraft is connected to the one or more terrestrial cellular communications networks as a single UE.

3. The method according to claim 2, wherein the plurality of ground base stations comprise a base transceiver station (BTS), a Node B, an eNode B, and/or a gNode B.

4. The method according to claim 1, comprising correcting, for one or more signals to be transmitted from the aircraft to any of the plurality of ground base stations, a time advance based on the location of the aircraft and the location of the corresponding one of the plurality of ground base stations to which the signals to be transmitted are to be transmitted.

5. The method according to claim 1, comprising estimating the location of the corresponding one of the plurality of ground base stations from a pointing angle of a beam of the antenna array pointing to the corresponding one of the plurality of ground base stations.

6. The method according to claim 1, comprising, before step a):
scanning in different spatial directions;
receiving, as a result of the scanning, one or more signals from different ground base stations in the different spatial directions, the plurality of ground base stations comprising the different ground base stations; and
selecting the first ground base station based on the one or more signals received from the different ground base stations.

7. The method according to claim 1, comprising determining the different spatial directions for scanning is based on a respective location of the further ground base stations estimated by the aircraft or stored in a database in the aircraft.

8. The method according to claim 1, wherein:
the different spatial directions scanned cover all ground-oriented spatial directions from the aircraft; and
there is a certain pre-established separation between the scanned different spatial directions.

9. The method according to claim 1, wherein the scanning of step b) starts when a handover triggering event happens.

10. The method according to claim 9, wherein the handover triggering event is based on a quality of the signal received from the first ground base station being below a certain threshold.

11. The method according to claim 1, wherein:
step b) comprises, as sub-steps:
  b1) receiving, from the further ground base stations in one or more of the different spatial directions, the one or more signals;
  b2) performing, for each of the one or more signals received from each of the further ground base stations, a Doppler frequency shift correction, the Doppler frequency shift correction comprising:
    calculating, for each of the one or more signals from each of the further ground base stations, the first Doppler frequency shift; and
    correcting, using the first Doppler frequency shift, a frequency shift in the one or more signals received; and
  b3) demodulating and decoding each of the one or more signals for which the Doppler frequency shift correction was performed in sub-step b2); and
step c) comprises, for each of the one or more signals demodulated and decoded in sub-step b3), measuring one or more signal parameters from each of the one or more signals received and selecting the candidate ground base station that is best, based on comparison of the measured signal parameters, for handover.

12. The method according to claim 1, wherein the moment is determined based at least on a comparison of one or more signal parameters of one or more signals received from the first ground base station with the one or more signal parameters of the one or more signals received from the candidate ground base station.

13. The method according to claim 1, wherein the electronic system comprises a software defined radio equipment.

14. A non-transitory computer readable medium encoded with a computer program comprising instructions for performing the method according to claim 1, wherein the computer program is executed on a computer system.

15. A system for Air-to-Ground communications between an aircraft and one or more terrestrial cellular communications networks for data transmission between user equipment (UE) of passengers onboard the aircraft and the one or more terrestrial cellular communications networks, the system being located in the aircraft and comprising:
    an antenna array comprising N radiating elements, N is being a design parameter and N being greater than 1;
    a plurality of radiofrequency transmitters and receivers configured, respectively, for transmission and reception of one or more signals, through the antenna array, to and from, respectively a plurality of ground base stations; and
    a digital signal processing module configured for:
        establishing a connection with a first ground base station of the plurality of ground base stations, the first ground base station being a part of a terrestrial cellular communications network;
        generating, using the antenna array, a beam and pointing the beam to the first ground base station;
        applying, while maintaining the beam of the antenna array pointed to the first ground base station, digital beamforming techniques to N radiating elements of the antenna array to generate a plurality of beams and, using the plurality of beams, scanning space in different spatial directions for further ground base stations of the plurality of ground base stations;
        selecting, out of the further ground base stations, a candidate ground base station for handover based on one or more signal parameters of one or more signals received, as a result of the scanning, from the further ground base stations, wherein the further ground base stations belong to the terrestrial cellular communications network or to a different terrestrial cellular communications network;
        causing, at a moment determined based at least on the one or more signal parameters of the one or more signals received from the further ground base stations, a handover of the connection from the first ground base station to the candidate ground base station selected in step c);
        for one or more signals received by the system from any of the plurality of ground base stations:
            calculating, based on at least one of a velocity of the aircraft, a location of the aircraft, and a location of a corresponding one of the plurality of ground base stations from which the one or more signals were received, a first Doppler frequency shift of the received signals; and
            correcting, using the first Doppler frequency shift, a frequency shift in the received one or more signals; and
        for one or more signals to be transmitted from the system to any of the plurality of ground base stations:
            estimating, based on at least one of a velocity of the aircraft, a location of the aircraft, and a location of a corresponding one of the plurality of ground base stations to which the one or more signals to be transmitted are to be transmitted, a second Doppler frequency shift that will affect the one or more signals to be transmitted when received by the corresponding one of the plurality of ground base stations; and
            shifting in frequency the one or more signals to be transmitted to pre-compensate the estimated second Doppler frequency shift,
    wherein the system is configured to send to the ground base station measurement reports that include the signal parameters of the signal received from the ground base station.

16. The system according to claim 15, wherein the system comprises a software defined radio equipment.

17. The method according to claim 15, comprising:
    connecting UE of a plurality of the passengers onboard the aircraft to an internal network of the aircraft;
    transmitting, via the antenna array, data received from the UE of the plurality of the passengers to the one or more terrestrial cellular communications networks;
    receiving, via the antenna array, data from the one or more terrestrial cellular communications networks; and
    sending, via the internal network of the aircraft, the data received from the one or more terrestrial cellular communications networks to the UE of the plurality of the passengers;
    wherein the aircraft is connected to the one or more terrestrial cellular communications networks as a single UE.

18. The system according to claim 15, wherein the digital signal processing module is configured for estimating the location of the corresponding one of the plurality of ground base stations from a pointing angle of a beam of the antenna array pointing to the corresponding one of the plurality of ground base stations.

19. The system according to claim 15, wherein the digital signal processing module is configured for correcting, for one or more signals to be transmitted from the aircraft to any of the plurality of ground base stations, a time advance based on the location of the aircraft and the location of the corresponding one of the plurality of ground base stations to which the signals to be transmitted are to be transmitted.

20. The system according to claim 15, wherein, before establishing the connection with the first ground base station, the digital signal processing module is configured for:
    scanning in different spatial directions;
    receiving, as a result of the scanning, one or more signals from different ground base stations in the different spatial directions, the plurality of ground base stations comprising the different ground base stations; and
    selecting the first ground base station based on the one or more signals received from the different ground base stations.

* * * * *